United States Patent
Lu et al.

(10) Patent No.: US 9,022,601 B2
(45) Date of Patent: May 5, 2015

(54) OPTICAL ELEMENT INCLUDING TEXTURING TO CONTROL BEAM WIDTH AND COLOR MIXING

(75) Inventors: Dong Jenna Lu, Cary, NC (US); Mark Edmond, Raleigh, NC (US); Mark Dixon, Morrisville, NC (US); Paul Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 140 days.

(21) Appl. No.: 13/442,311

(22) Filed: Apr. 9, 2012

(65) Prior Publication Data

US 2013/0265772 A1 Oct. 10, 2013

(51) Int. Cl.
| | |
|---|---|
| *F21V 1/00* | (2006.01) |
| *F21V 11/00* | (2006.01) |
| *G02B 5/02* | (2006.01) |

(52) U.S. Cl.
CPC ............ *G02B 5/0215* (2013.01); *G02B 5/0278* (2013.01)

(58) Field of Classification Search
USPC .......... 362/231, 237, 247; 359/336, 619, 708, 359/726
See application file for complete search history.

(56) References Cited

U.S. PATENT DOCUMENTS

| | | | |
|---|---|---|---|
| 3,581,162 A | 5/1971 | Wheatley | |
| 5,343,330 A * | 8/1994 | Hoffman et al. | ............... 359/708 |
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,270,697 B1 | 8/2001 | Myers et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,543,911 B1 | 4/2003 | Rizkin et al. | |
| 6,550,953 B1 | 4/2003 | Ichikawa et al. | |
| 6,634,770 B2 | 10/2003 | Cao | |
| 6,654,172 B2 * | 11/2003 | Pond et al. | ..................... 359/619 |
| 6,659,632 B2 | 12/2003 | Chen | |

(Continued)

FOREIGN PATENT DOCUMENTS

| | | |
|---|---|---|
| EP | 1058221 A2 | 12/2000 |
| EP | 0890059 B1 | 6/2004 |

(Continued)

OTHER PUBLICATIONS

Lu, Dong, U.S. Appl. No. 13/093,085, filed Apr. 25, 2011.

(Continued)

*Primary Examiner* — Thomas A Hollweg
(74) *Attorney, Agent, or Firm* — Charles L. Moore; Moore & Van Allen PLLC

(57) ABSTRACT

A method for providing an optical element may include providing an optical feature in the optical element that spreads or distributes light passing through the optical element. The method may also include providing a texturing in at least a portion of the optical feature of the optical element.

43 Claims, 14 Drawing Sheets

(56) References Cited

U.S. PATENT DOCUMENTS

| | | | |
|---|---|---|---|
| 6,709,132 | B2 | 3/2004 | Ishibashi |
| 6,803,607 | B1 | 10/2004 | Chan et al. |
| 6,848,819 | B1 | 2/2005 | Arndt et al. |
| 6,859,326 | B2* | 2/2005 | Sales ............................ 359/619 |
| 6,864,513 | B2 | 3/2005 | Lin et al. |
| 6,948,829 | B2 | 9/2005 | Verdes et al. |
| 6,953,264 | B2* | 10/2005 | Ter-Hovhannisian ........ 362/241 |
| 6,982,518 | B2 | 1/2006 | Chou et al. |
| 7,048,412 | B2 | 5/2006 | Martin et al. |
| 7,080,924 | B2 | 7/2006 | Tseng et al. |
| 7,086,756 | B2 | 8/2006 | Maxik |
| 7,086,767 | B2 | 8/2006 | Sidwell et al. |
| 7,144,135 | B2 | 12/2006 | Martin et al. |
| 7,165,866 | B2 | 1/2007 | Li |
| 7,172,314 | B2 | 2/2007 | Currie et al. |
| 7,213,940 | B1 | 5/2007 | Van De Ven et al. |
| 7,354,174 | B1 | 4/2008 | Yan |
| 7,396,142 | B2 | 7/2008 | Laizure, Jr. et al. |
| 7,441,929 | B2* | 10/2008 | Stefanov et al. ............. 362/336 |
| 7,482,567 | B2* | 1/2009 | Hoelen et al. ................. 250/205 |
| 7,600,882 | B1 | 10/2009 | Morejon et al. |
| 7,726,836 | B2 | 6/2010 | Chen |
| 7,733,567 | B2* | 6/2010 | Li et al. ......................... 359/619 |
| 7,824,065 | B2 | 11/2010 | Maxik |
| D629,560 | S* | 12/2010 | Shimokawa ................. D26/124 |
| 7,918,583 | B2* | 4/2011 | Chakmakjian et al. ....... 362/240 |
| 7,956,375 | B2* | 6/2011 | Li et al. ........................... 257/98 |
| 8,021,025 | B2 | 9/2011 | Lee |
| 8,174,740 | B2* | 5/2012 | Baxter et al. .................. 358/488 |
| 8,253,316 | B2 | 8/2012 | Sun et al. |
| 8,272,762 | B2 | 9/2012 | Maxik et al. |
| 8,274,241 | B2 | 9/2012 | Guest et al. |
| 8,277,082 | B2 | 10/2012 | Dassanayake et al. |
| 8,282,250 | B1 | 10/2012 | Dassanayake et al. |
| 8,292,468 | B2 | 10/2012 | Narendran et al. |
| 8,322,896 | B2 | 12/2012 | Falicoff et al. |
| 8,371,722 | B2 | 2/2013 | Carroll |
| 8,395,167 | B2* | 3/2013 | Kang et al. ....................... 257/95 |
| 8,400,051 | B2 | 3/2013 | Hakata et al. |
| 8,415,865 | B2 | 4/2013 | Liang et al. |
| 8,421,320 | B2 | 4/2013 | Chuang |
| 8,421,321 | B2 | 4/2013 | Chuang |
| 8,421,322 | B2 | 4/2013 | Carroll et al. |
| 8,449,154 | B2 | 5/2013 | Uemoto et al. |
| 8,502,468 | B2 | 8/2013 | Li et al. |
| 8,641,237 | B2 | 2/2014 | Chuang |
| 8,653,723 | B2 | 2/2014 | Cao et al. |
| 8,696,168 | B2 | 4/2014 | Li et al. |
| 8,740,415 | B2 | 6/2014 | Wheelock |
| 8,750,671 | B1 | 6/2014 | Kelly et al. |
| 8,752,984 | B2 | 6/2014 | Lenk et al. |
| 8,760,042 | B2 | 6/2014 | Sakai et al. |
| 2002/0024822 | A1* | 2/2002 | Pond et al. .................... 362/555 |
| 2003/0132445 | A1* | 7/2003 | Yoshitake et al. ............... 257/84 |
| 2004/0201990 | A1 | 10/2004 | Meyer |
| 2005/0169008 | A1* | 8/2005 | Okazaki ......................... 362/558 |
| 2006/0050530 | A1* | 3/2006 | Stefanov et al. .............. 362/602 |
| 2006/0102914 | A1* | 5/2006 | Smits et al. ...................... 257/98 |
| 2006/0291206 | A1* | 12/2006 | Angelini et al. .............. 362/244 |
| 2007/0035844 | A1* | 2/2007 | Li et al. .......................... 359/619 |
| 2007/0215793 | A1* | 9/2007 | Gruhlke et al. ............... 250/221 |
| 2007/0268694 | A1* | 11/2007 | Bailey et al. .................. 362/231 |
| 2008/0043466 | A1* | 2/2008 | Chakmakjian et al. ....... 362/237 |
| 2008/0247173 | A1* | 10/2008 | Danek et al. .................. 362/309 |
| 2008/0310159 | A1* | 12/2008 | Chinniah et al. .............. 362/244 |
| 2009/0050907 | A1* | 2/2009 | Yuan et al. ....................... 257/88 |
| 2009/0168414 | A1* | 7/2009 | Bailey ............................ 362/231 |
| 2009/0184618 | A1 | 7/2009 | Hakata et al. |
| 2009/0219716 | A1* | 9/2009 | Weaver et al. ................. 362/235 |
| 2009/0225400 | A1* | 9/2009 | Ansems et al. ................ 359/315 |
| 2009/0269550 | A1 | 10/2009 | Kuo |
| 2010/0091499 | A1* | 4/2010 | Jiang et al. .................... 362/268 |
| 2010/0142200 | A1* | 6/2010 | Huang ........................... 362/235 |
| 2010/0226127 | A1* | 9/2010 | Bigliatti et al. ............... 362/235 |
| 2010/0238526 | A1* | 9/2010 | Baxter et al. .................. 358/509 |
| 2010/0284194 | A1* | 11/2010 | Miyashita et al. ........ 362/311.09 |
| 2010/0295014 | A1* | 11/2010 | Kang et al. ....................... 257/13 |
| 2011/0170289 | A1* | 7/2011 | Allen et al. .................... 362/235 |
| 2011/0234580 | A1 | 9/2011 | Wang et al. |
| 2011/0273882 | A1 | 11/2011 | Pickard |
| 2012/0040585 | A1 | 2/2012 | Huang |
| 2014/0092604 | A1* | 4/2014 | Roth et al. ................ 362/311.02 |

FOREIGN PATENT DOCUMENTS

| | | |
|---|---|---|
| GB | 2345954 A | 7/2000 |
| GB | 2474921 A | 5/2011 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |

OTHER PUBLICATIONS

Longmold Technology Co., Ltd., Technical Reference—Longmold Technology, Pre-Texturing Mold Finishes Required—Surface Fin, Apr. 9, 2006, http://www.longmold.com/viewnews.php?id=57, dated Nov. 11, 2011, 2 pgs.

Mold-Tech, Texturing in Depth: Everything You Need to Know About Texturing Your Mold, 26 pgs. (no date on document).

Cree, Inc., International Application No. PCT/US2013/034208, International Search Report and Written Opinion, Jun. 24, 2013.

* cited by examiner

| TEXTURING NO. | DEPTH (D) | DRAFT ANGLE (θ) |
|---|---|---|
| MT-11000 | 0.0004" | 1° |
| MT-11010 | 0.001" | 1.5° |
| MT-11020 | 0.0015" | 2.5° |
| MT-11030 | 0.002" | 3° |
| MT-11040 | 0.003" | 4.5° |
| MT-11050 | 0.0045" | 6.5° |

OPTICAL ELEMENT INCLUDING TEXTURING TO CONTROL BEAM WIDTH AND COLOR MIXING

BACKGROUND

Aspects of the present invention relate to lighting, and more particularly to an optical element including texturing to control beam width and color mixing of light from a lighting device.

Light emitting diodes (LEDs) are finding more and more applications in general lighting as a result of the increase in efficiency of LEDs. Because of the semiconductor bandgap nature of LEDs as a light source, LEDs can provide a wide range of color by either a single color LED or by mixing the light from several LEDs of different colors. One example is the True White technology, which combines a blue shifted yellow (BSY) and red LED in proper lumen proportion to achieve high efficacy white color light with a high color rendering index (CRI). For multi-color LED lighting, providing well mixed color is challenging. Uniform color mixing in directional LED lighting applications can also present difficulties.

Typically the angular distribution of light emitted from an LED is close to Lambertian, which has a full width at half maximum (FWHM) beam angle of 120 degrees. Directional LED lighting preferably has a narrower beam angle, such as about 12 degrees, about 25 degrees, or about 40 degrees, or other angles depending on the application. The collimation of the light is usually realized by a reflector or a total internal reflector (TIR). With multi-color LEDs, the light leaving the reflector or TIR optics are usually not well mixed and sometimes the beam profile is not smooth enough. The beam profile being smooth may be defined as the footprint of a beam of light on a surface not having a patchy appearance or the brightness of the beam not being patchy or irregular within the beam footprint or beam profile.

SUMMARY

According to one aspect of the present invention, a method for providing an optical element may include providing an optical feature in the optical element that spreads or distributes light passing through the optical element. The method may also include providing a texturing in at least a portion of the optical feature of the optical element.

According to another aspect of the present invention, a method for providing a lighting device may include providing a light source and providing an optical element that receives and transmits light from the light source. The method may also include providing an optical feature in the optical element that spreads or distributes the light passing through the optical element. The method may additionally include providing a texturing in at least a portion of the optical feature.

According to another aspect of the present invention, an optical element may include an optical feature in the optical element that spreads or distributes light passing through the optical element. The optical element may also include a texturing in at least a portion of the optical feature.

According to another aspect of the present invention, an optical system for a lighting device may include a first optical element and an optical feature provided in the first optical element that spreads or distributes light passing through the first optical element. The optical system may also include a second optical element and a texturing in at least a portion of the second optical element.

According to another aspect of the present invention, lighting device may include a light source and an optical element that receives and transmits light from the light source. The lighting device may also include an optical feature in the optical element that spreads or distributes the light passing through the optical element and a texturing in at least a portion of the optical feature.

BRIEF DESCRIPTION OF THE DRAWINGS

FIG. 5 is a chromaticity diagram illustrating a simulation of color spatial uniformity from a lens having a multiplicity of micro-optic lenses provided therein without any texturing of the lens or micro-optic lenses.

FIG. 7 is a chromaticity diagram illustrating a simulation of color spatial uniformity from a lens having a multiplicity of micro-optic lenses provided therein with industry standard surface texturing or finishing MT11020 of the lens or micro-optic lenses in accordance with an embodiment of the present invention.

DETAILED DESCRIPTION

Figure 1:
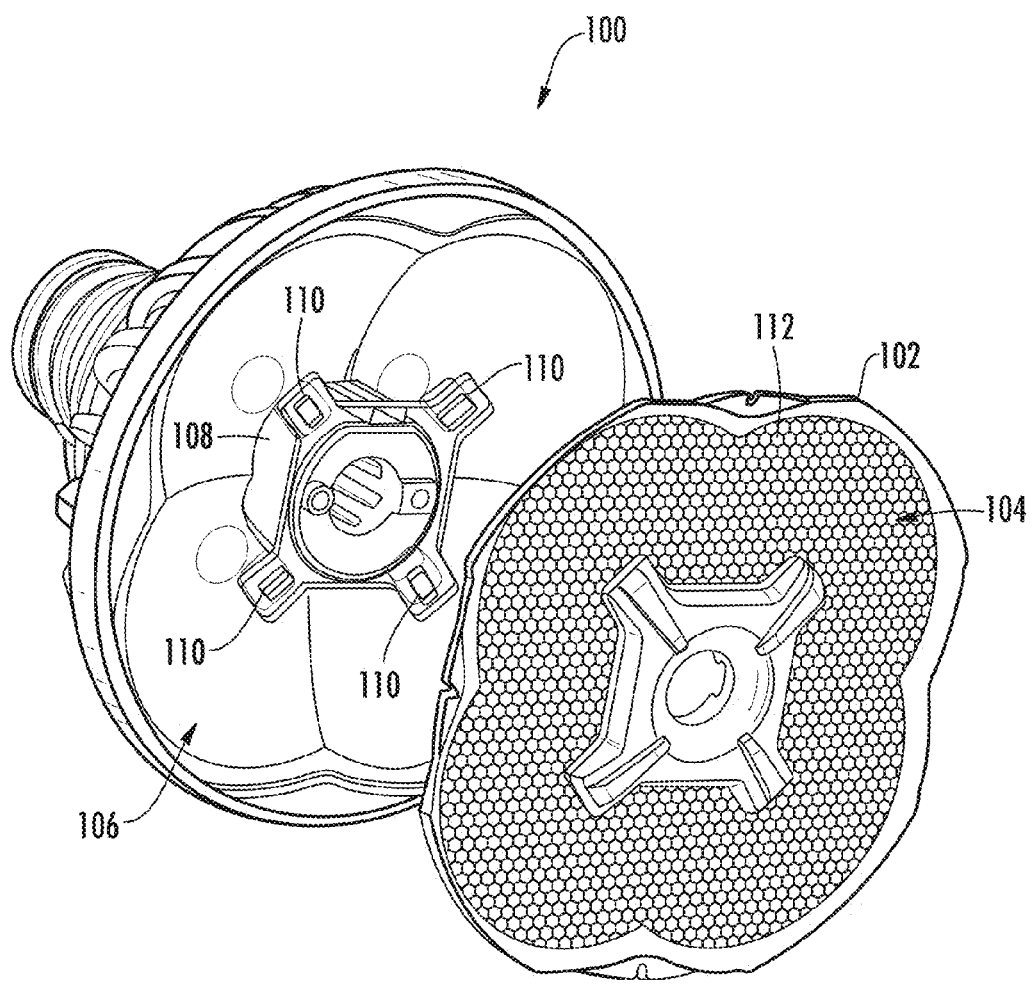
FIG. 1 is an exploded perspective view of an example of a lighting device including a lens having a chosen texturing to control beam width and color mixing of light from the lighting device in accordance with an embodiment of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 is an exploded perspective view of an example of a lighting device 100 having a lens 102 or optical element including a chosen texturing 104 or surface texturing to control beam width, color mixing or other characteristics of light from the lighting device 100 in accordance with an embodiment of the present invention. An example of a surface texturing feature that may be used for the chosen surface texturing 104 is described with reference to FIGS. 2A and 2B. Examples of lighting devices in which the lens 102 including chosen texturing 104 may be used are disclosed and claimed in U.S. patent application Ser. No. 13/167,351, filed Jun. 23, 2011, and entitled "Retroreflective, Multi-Element Design for a Solid State Directional Lamp;" U.S. patent application Ser. No. 13/167,387, filed Jun. 23, 2011, and entitled "Hybrid Solid State Emitter Printed Circuit Court Board for Use in a Solid State Directional Lamp;" and U.S. patent application Ser. No. 13/167,394, filed Jun. 23, 2011, and entitled "Solid State Directional Lamp Including Retroreflective, Multi-Element Directional Lamp Optic." Each of these patent applications is assigned to the same assignee as the present application and each is incorporated herein in its entirety by reference.

The lighting device 100 may include a reflector 106 or TIR and a lighting element assembly 108 may be mounted in the lighting fixture in Association with the reflector 106 to reflect light from the lighting element assembly 108. The lighting element assembly 108 may include a light source or a plurality of solid state light emitters 110 mounted to the lighting element assembly 108. The solid state light emitters may be LEDs. The lens 102 or optical element may be disposed or attached over the reflector 106 and enclosing the lighting element assembly 108.

As described in more detail herein, the lens 102 may include an optical feature 112 provided or formed in the lens 102 or optical element that spreads or distributes light passing through the lens 102. In accordance with an embodiment of the invention, the optical feature 112 may be a micro-optics array including a multiplicity of micro lenses. The texturing 104 may be provided or formed in at least a portion of the optical feature of the lens 102 or optical element. The texturing 104 may be provided in at least one surface of the lens 102. The texturing 104, or the texturing in association with the optical feature 112 or micro-optics array, may be adapted or chosen to provide at least one of a predetermined beam width or beam angle, a predetermined color mixing or color uniformity, and a predetermined beam shape smoothing of light passing through the lens 102 or optical element. As described in more detail herein, the texturing 104 and the optical feature 112 may be selected or chosen in coordination with one another to control at least these predetermined characteristics of the light or light beam passing through the lens and to provide the desired light characteristics depending upon the lighting application. As described below, the texturing 104 and the optical feature 112 may be selected or chosen in coordination with one another to satisfy Energy Star color spatial uniformity specifications or requirements.

In accordance with the embodiment illustrated in FIG. 1, the reflector 106 collimates the light emitted from the solid state light emitters 110 or LEDs into a light beam having a preset beam angle smaller than a beam angle desired from the lighting device 100. The micro-optics array 112 is provided or formed on one surface of the lens 102 to spread the light into a beam angle relatively smaller than a desired or predetermined beam angle from the lighting device 100. The texturing 104, which may be applied to the micro-optics lens surface by controlled roughing, provides diffusivity of the light beam as it passes through the micro-optics lens 102 and broadens the light beam by additional degrees. The combination of the micro-optics and the diffusive surface of the lens 102 spread the incident beam to the desired or predetermined beam angle.

The lens 102 may be molded from a transparent plastic material or similar material. In the molding process, the shape and roughness of the lens 102 may be defined by the tool used to mold the lens 102. Accordingly, a predetermined microlens shape may be cut into the tool. The tool may then be etched with the chosen surface texturing. An example of a method for providing or forming a tool for fabricating a lens including a chosen surface texturing in accordance with an embodiment of the present invention will be described with reference to FIG. 3. Also, FIGS. 4A-4C illustrate an example of a sequence of stages in providing an exemplary tool or mold for fabricating a lens including surface texturing. The chosen surface texturing 104 may be an industry standard surface finishing texture, such as a Mold-Tech (MT) series surface finishing texturing (MT11010, MT 11020, etc.) or other surface finishing texture. Mold-Tech is a trademark of Standex International Corporation in the United States, other countries or both. An example of an industry standard surface finishing texture 200 is illustrated in FIG. 2A.

Figures 2A, 2B:
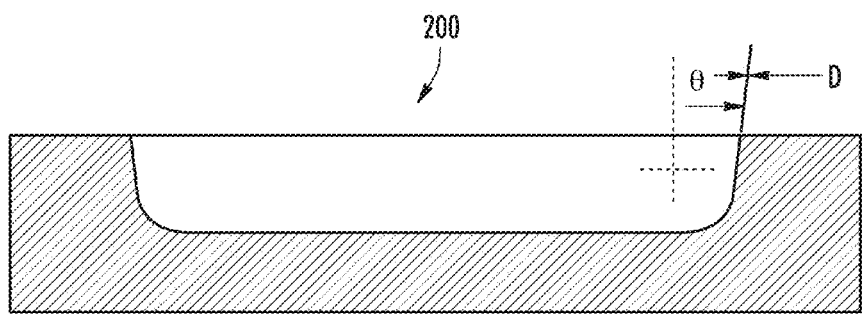
FIG. 2A is a detailed illustration of an example of a surface texturing feature, a multiplicity of which may be provided in a surface of a lens to control beam width and color mixing of light from a lighting device in accordance with an embodiment of the present invention.
FIG. 2B is a table including specifications for surface texturing or finishing that may be applied to the surface texturing feature of FIG. 2A in accordance with an embodiment of the present invention.

FIG. 2A is a detailed illustration of an example of a surface texturing feature, a multiplicity of which may be provided or formed in a surface of a lens or optical element to control beam width, color mixing and beam shape smoothing of light from a lighting device in accordance with an embodiment of the present invention. FIG. 2B is a table 202 including depth and draft specifications for different industry standard surface texturing or finishing that may be used for the surface texturing feature in FIG. 2A.

Figure 3:
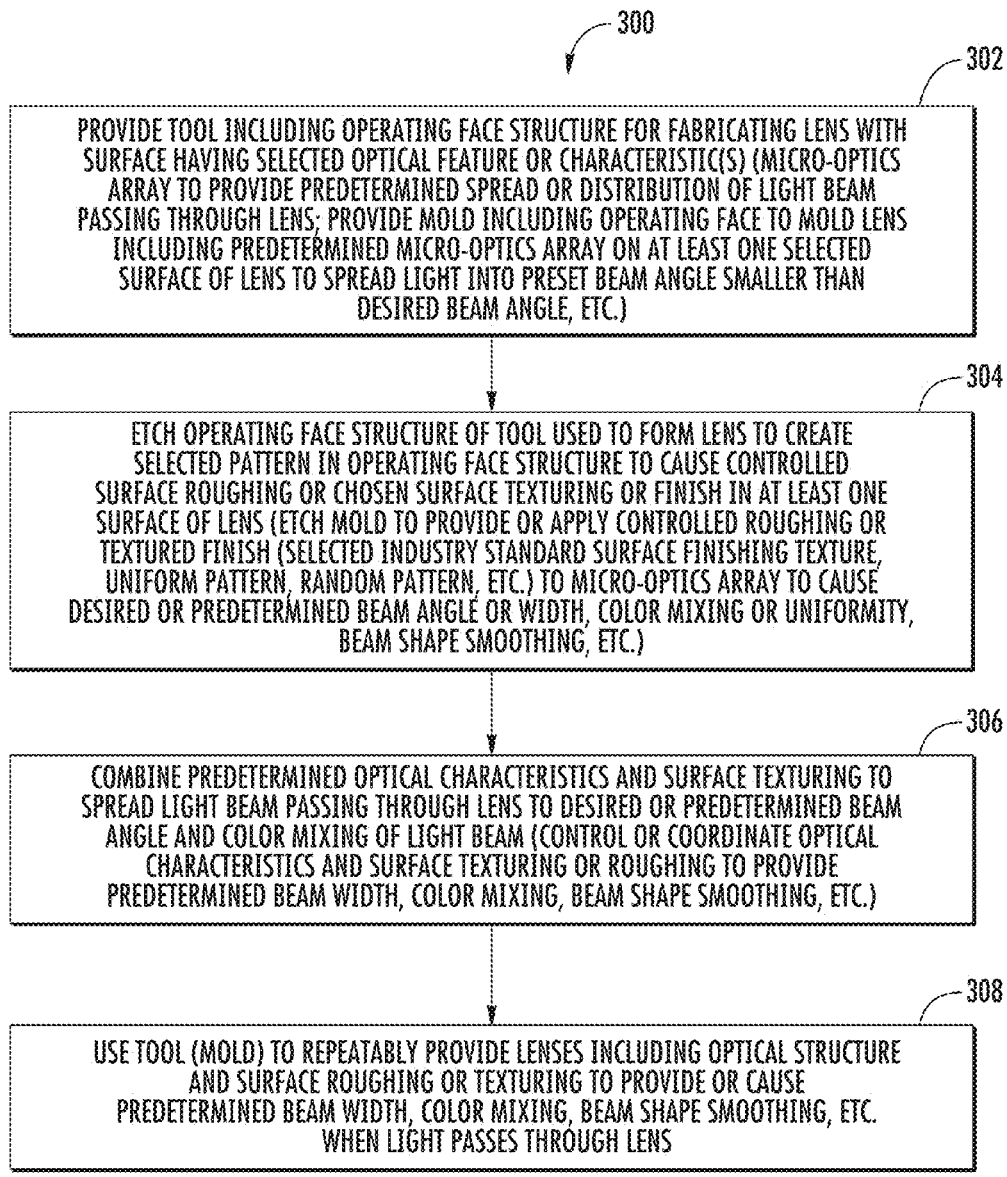
FIG. 3 is a flow chart of an example of a method for providing a tool for fabricating a lens including a surface texturing to control beam width and color mixing of light from a lighting device in accordance with an embodiment of the present invention.
Figure 4A:
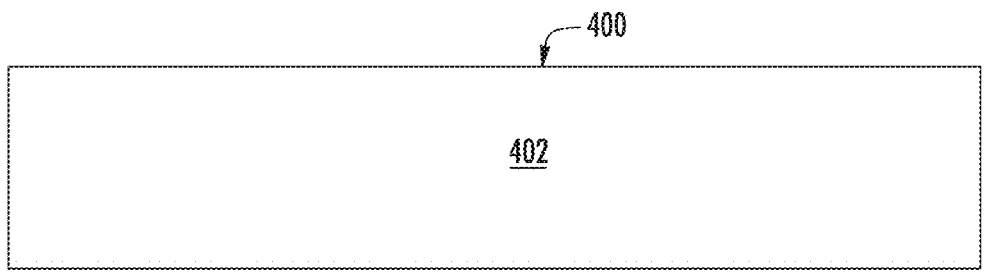
FIGS. 4A-4C illustrate a sequence of exemplary stages in providing a tool for fabricating a lens including a surface texturing to control beam width and color mixing of light from a lighting device in accordance with an embodiment of the present invention.
Figure 4B:
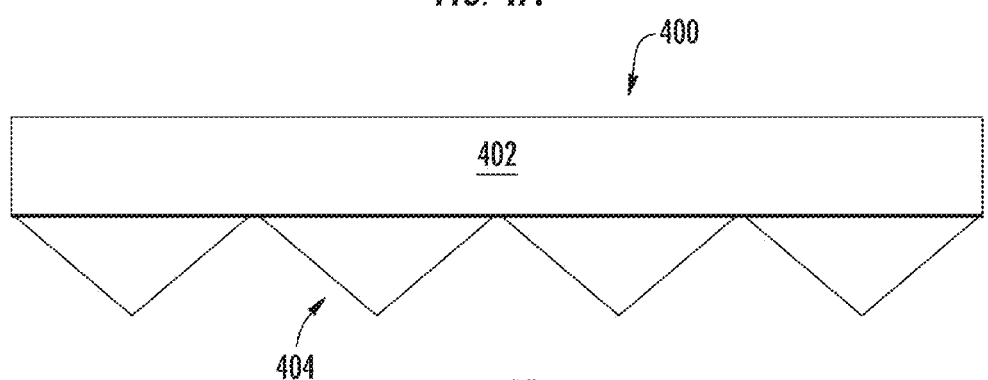
Figure 4C:
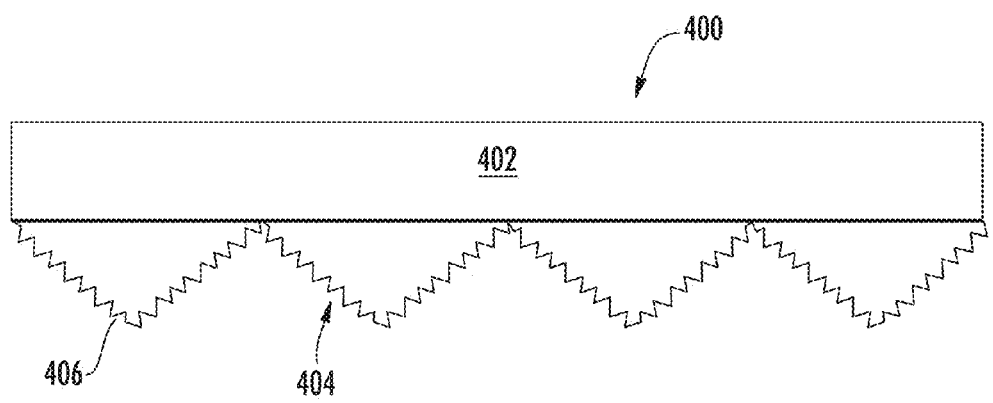

FIG. 3 is a flow chart of an example of a method 300 for providing a tool for fabricating a lens or optical element including a chosen texturing to control beam width and color mixing of light from a lighting device in accordance with an embodiment of the present invention. In block 302, a tool may be provided including an operating face structure for fabricating a lens with a surface having a selected optical feature, characteristic or characteristics. As previously discussed, the selected optical feature may be a micro-optics array formed in a selected surface of the lens to provide a predetermined spread or distribution of a light beam passing through the lens. The lens may be formed from a moldable material, such as a plastic or other moldable material. Accordingly a mold may be formed including an operating face to mold the lens including the predetermined micro-optics array on at least one selected surface of the lens to spread the light into a preset beam angle smaller than a desired or predetermined beam angle from a finished lens.

In block 304, the operating face structure of the tool used to provide the lens may be etched or otherwise configured to create a selected pattern in the operating face structure of the tool to provide or apply controlled surface roughing or a chosen surface texturing or finish in at least one surface of the lens. The operating face structure of the tool may be etched or configured to apply a selected industry standard surface finishing texture to the lens or to the selected optical feature or micro-optics array. The chosen surface texturing may be applied to the lens in a uniform pattern or in some other pattern, such as a random pattern depending upon the desired diffusivity or other characteristics of the light passing through the lens. The controlled surface roughing or chosen surface texturing may be applied to the micro-optics array to cause the desired or predetermined beam angle or width, predetermined color mixing or uniformity, a predetermined beam smoothing or other desired characteristics of the light passing through the lens. The texturing may be provided in at least a portion of the optical feature or micro-optics array. In another embodiment, the texturing may be provided in selected ones of the multiplicity of micro lenses of the micro-optics array.

In block 306, the predetermined optical characteristics and chosen surface texturing may be combined or coordinated to spread the light beam passing through the lens to the desired or predetermined beam angle and to provide the desired or predetermined color mixing or uniformity of the light beam. Accordingly, the optical characteristics or selected optical feature and chosen surface texturing or roughing may be controlled or selected in coordination with one another to provide the predetermined beam width, color mixing or color uniformity and beam shape smoothing.

In block 308, the tool or mold may be used to repeatedly provide lenses including the selected optical feature or structure and chosen surface roughing or texturing to provide or cause the predetermined beam width, color mixing and beam shape smoothing characteristics.

While the operations or steps in FIG. 3 are illustrated and described in a certain sequence, the present invention is not intended to be limited by the sequence or order illustrated. The steps and operations may be performed in any order unless otherwise specified. Some operations or steps may also be performed simultaneously or combined.

FIGS. 4A-4C illustrate an example of a sequence of stages in providing or forming an exemplary tool 400 for fabricating a lens including a chosen surface texturing to control beam width and color mixing of light from a lighting device in accordance with an embodiment of the present invention. Only a portion of the exemplary tool 400 for fabricating the lens is illustrated in FIGS. 4A-4C for purposes of clarity and to show more detail of the process for providing the tool 400 and the tool itself. In accordance with an embodiment of the invention, the tool 400 may be a mold for molding a plastic or other moldable material. The sequence of exemplary stages are similar to the operations in the method 300 described with reference to FIG. 3.

In FIG. 4A, a piece of material 402 may be provided for forming the tool 400. The material may be any sort of material suitable for forming a mold for molding a plastic or other moldable material.

In FIG. 4B, the piece of material 402 may be cut or formed to include an operating face structure 404 for fabricating the lens with a surface having a selected optical feature or characteristics. As previously described, the selected optical feature may be a micro-optics array or other optical feature to provide a predetermined spread or distribution of a light beam passing through the lens.

In FIG. 4C, the operating face structure 404 of the tool 400 may be etched or otherwise formed to create a selected pattern 406 in the operating face structure 404 of the tool 400 to cause controlled surface roughing or to create a chosen surface texturing or finish in at least one surface of the lenses to be formed by the tool 400 or mold. As previously discussed, the controlled surface roughing or chosen surface texturing may be a selected industry standard surface finishing texture similar to that illustrated in FIG. 2A and the specification for different industry standard texturing numbers shown in the table 202 in FIG. 2B. Other types of surface roughing or surface texturing may also be used depending upon the particular application or lighting characteristics desired.

The surface roughing or texturing may be chosen or selected in combination with other lens parameters or optical features to meet or satisfy Energy Star color spatial specifications or requirements for directional lamps, such as for example lamp types BR, ER, K, MR, PAR, R or other type directional lamps. The current Energy Star color spatial uniformity requirement provides that the variation of chromaticity within the beam angle shall be within 0.006 from a weighted average point on a International Commission on Illumination (French Commission Internationale d'éclairage (CIE)) CIE 1976 (u',v') diagram. The angular chromaticity measurements shall be made at the center and edge of the beam. The measurements shall be made in at least two vertical planes 90 degrees apart. Results shall be averaged from the different vertical planes. It should be noted that the Environmental Protection Agency (EPA) apparently has a specification in draft form that proposes to reduce the variation of chromaticity from 0.006 to 0.004.

Figure 5:
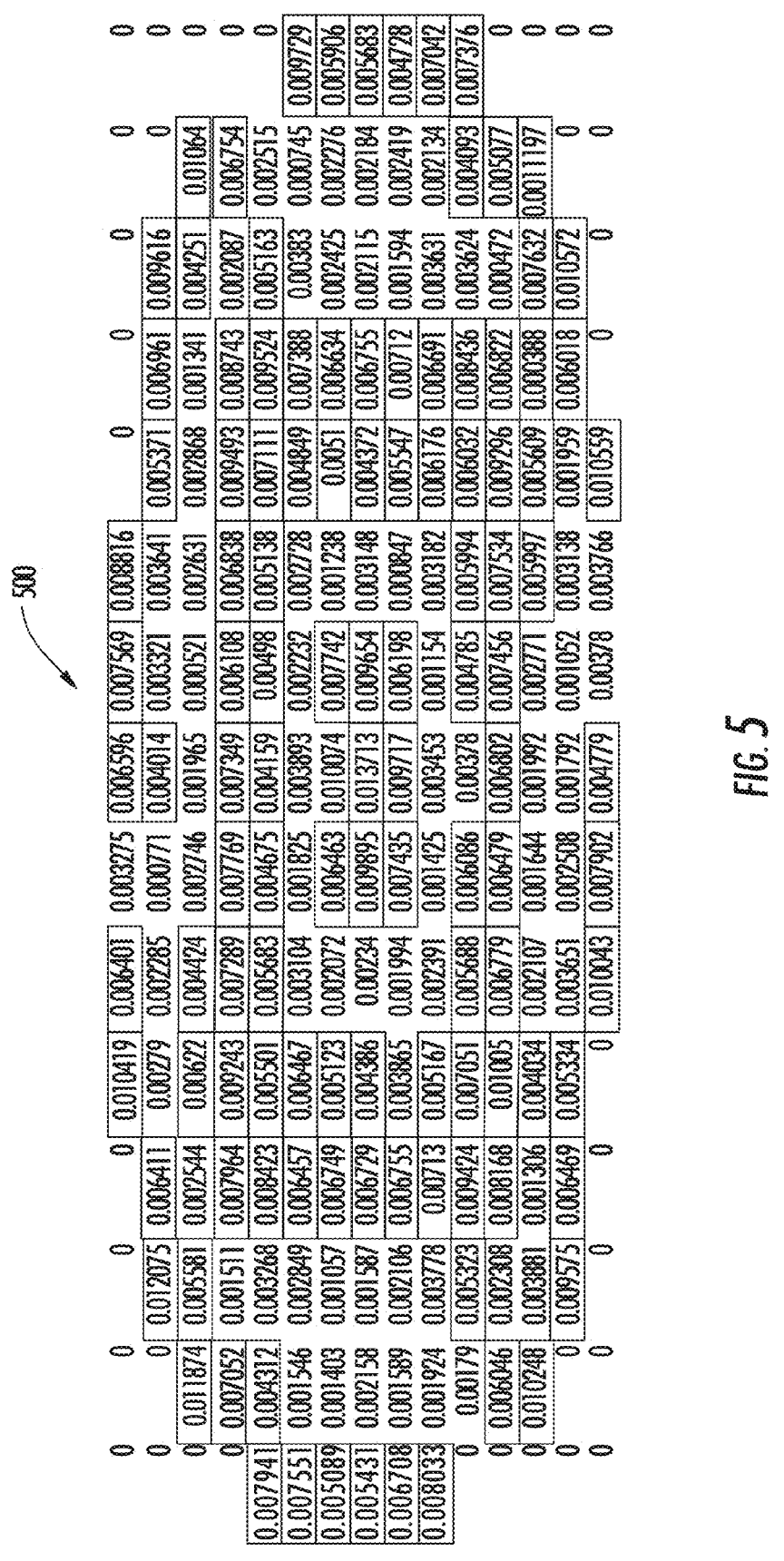
Figure 6:
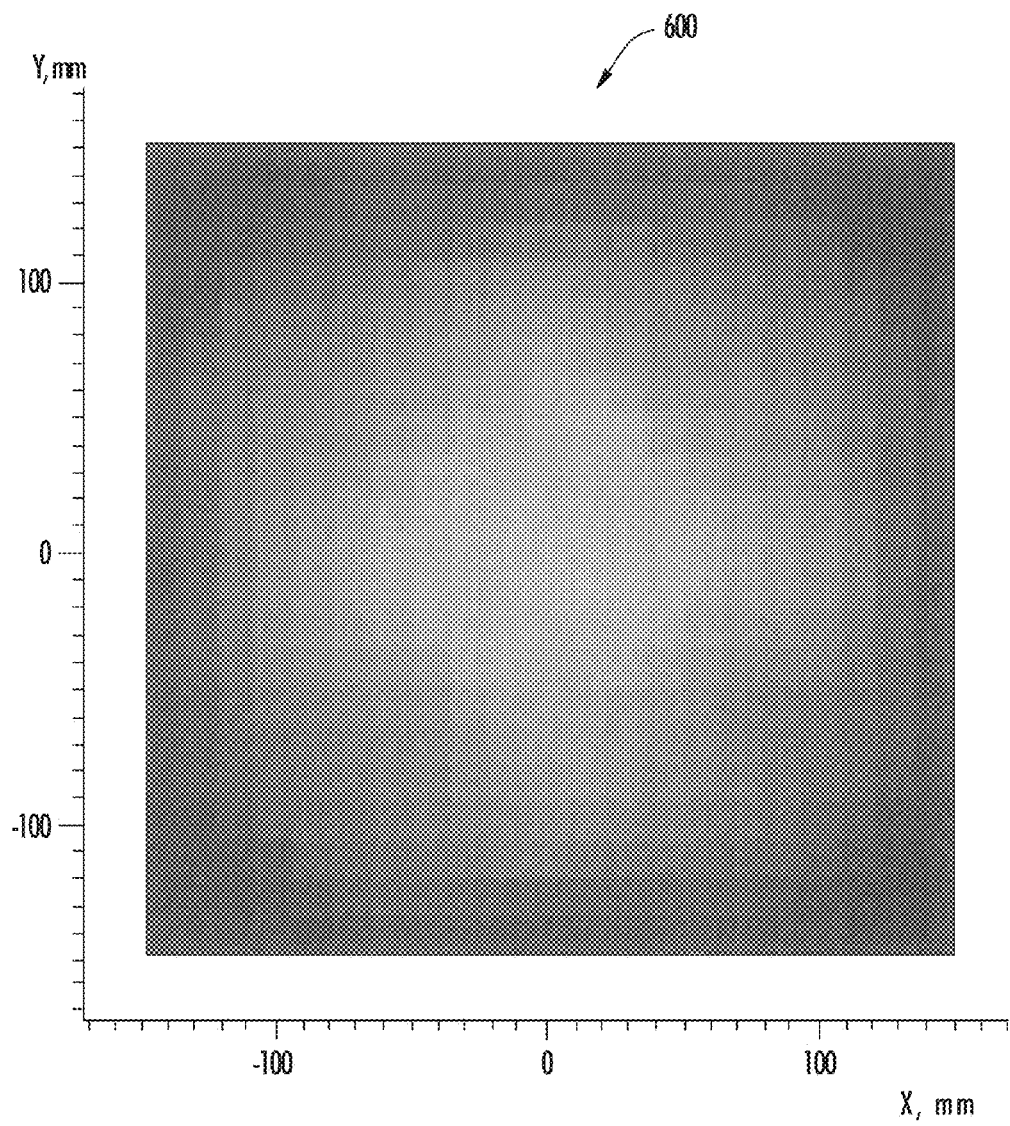
FIG. 6 is an illustration of the color spatial uniformity corresponding to the chromaticity diagram in FIG. 5.

FIG. 5 is a chromaticity diagram 500 illustrating a simulation of color spatial uniformity of a beam of light from a lens having a multiplicity of micro-optic lenses provided or formed therein without any surface texturing of the lens or micro-optic lenses. The color chromaticity diagram 500 is for a 25 degree beam of light shining on a flat or planar surface. As illustrated in the diagram 500, the variation in chromaticity exceeds more than about 0.004 in many places within the beam. FIG. 6 is an illustration of the color spatial uniformity graph for the beam of light corresponding to the chromaticity diagram 500 in FIG. 5.

Figure 7:
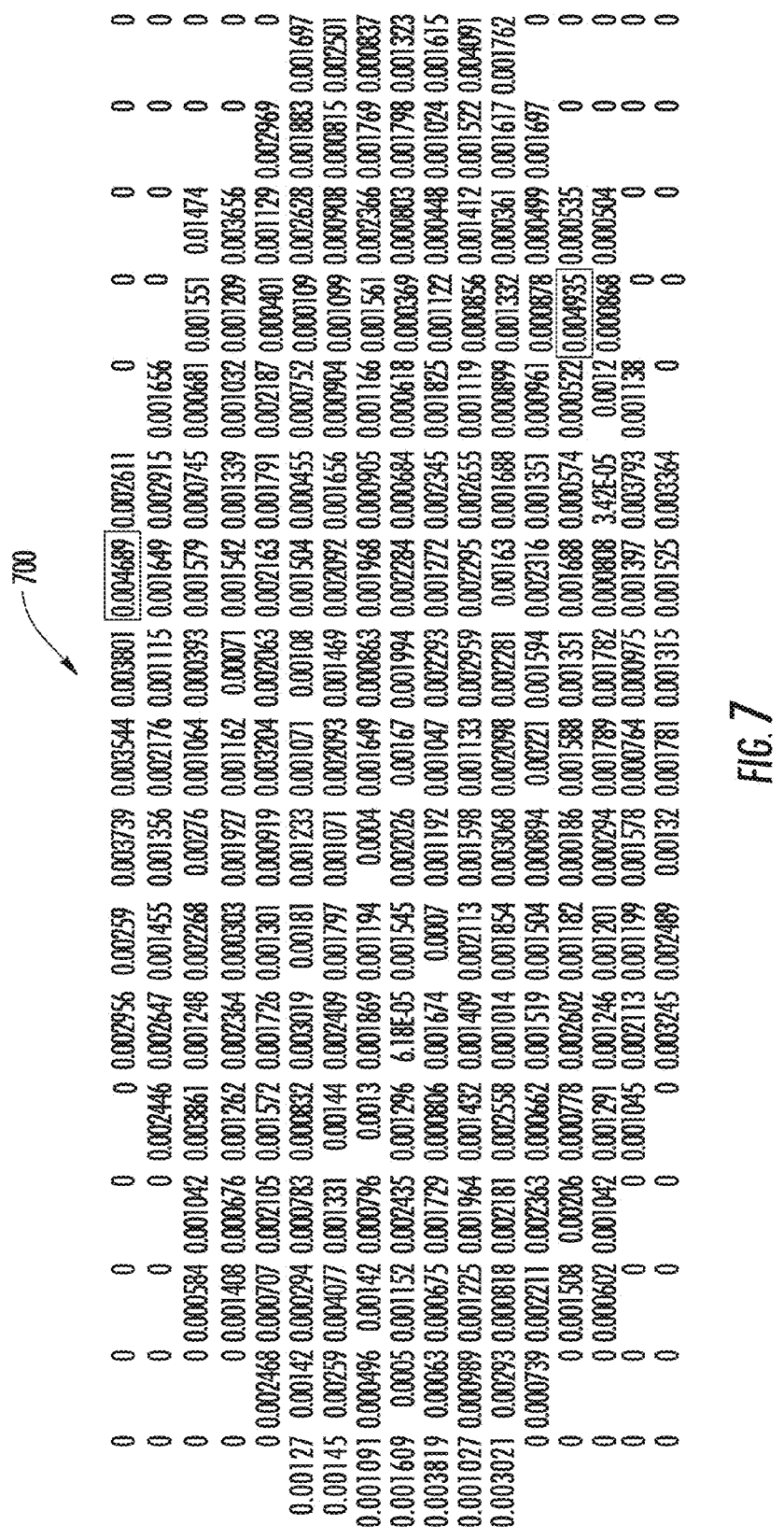
Figure 8:
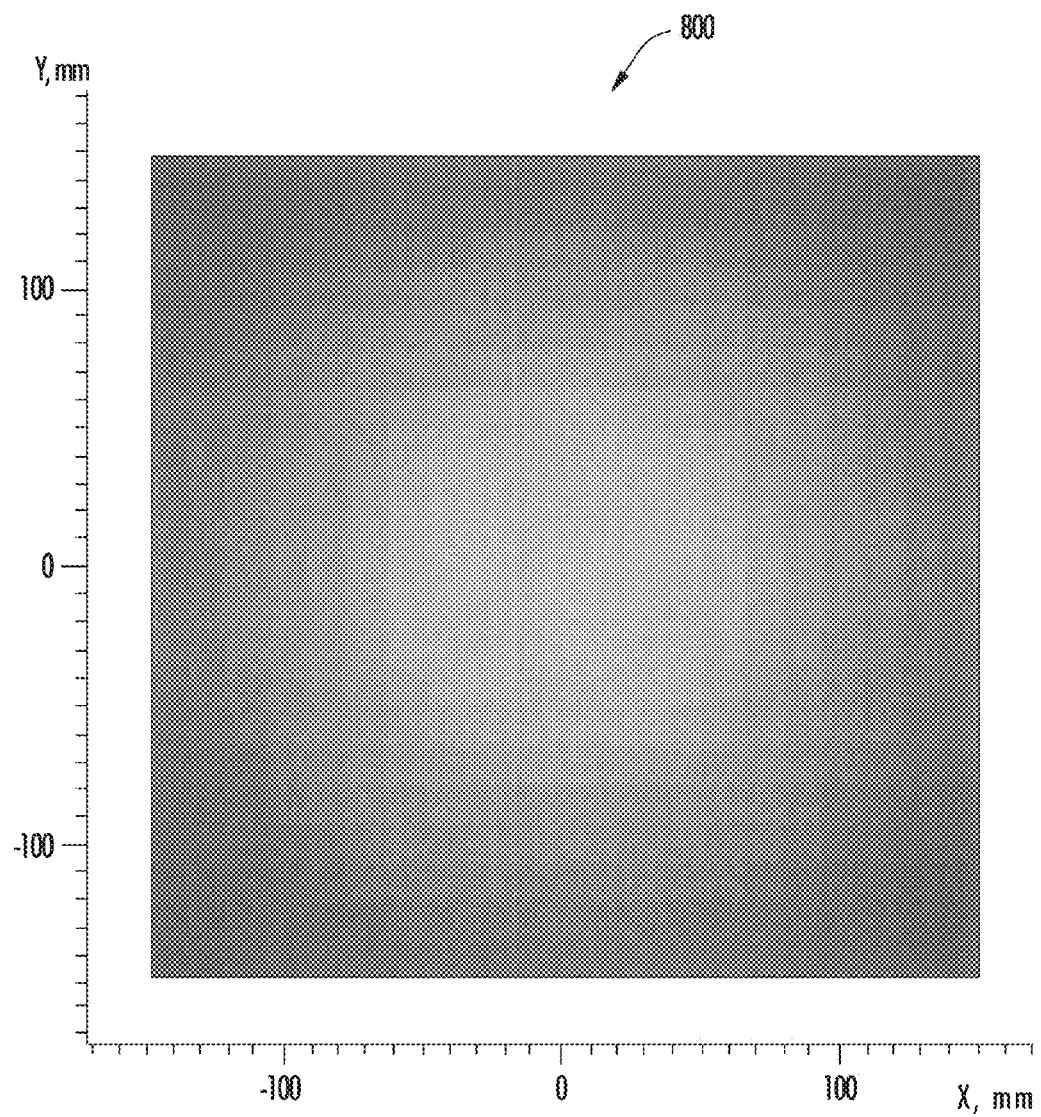
FIG. 8 is an illustration of the color spatial uniformity corresponding to the chromaticity diagram in FIG. 7.

In contrast to FIGS. 5 and 6, FIG. 7 is a chromaticity diagram 700 illustrating a simulation of color spatial uniformity of a beam of light from a lens including a multiplicity of micro-optic lenses provided therein and with standard surface texturing or finishing MT11020 of the lens or micro-optic lenses in accordance with an embodiment of the present invention. The color chromaticity diagram 700 also represents a 25 degree beam of light shining on a flat or planar surface. As illustrated in the chromaticity diagram 700, the variation in chromaticity is less than about 0.004 in many places within the beam. FIG. 8 is an illustration of the color spatial uniformity graph 800 corresponding to the chromaticity diagram 700 in FIG. 7.

Figure 9:
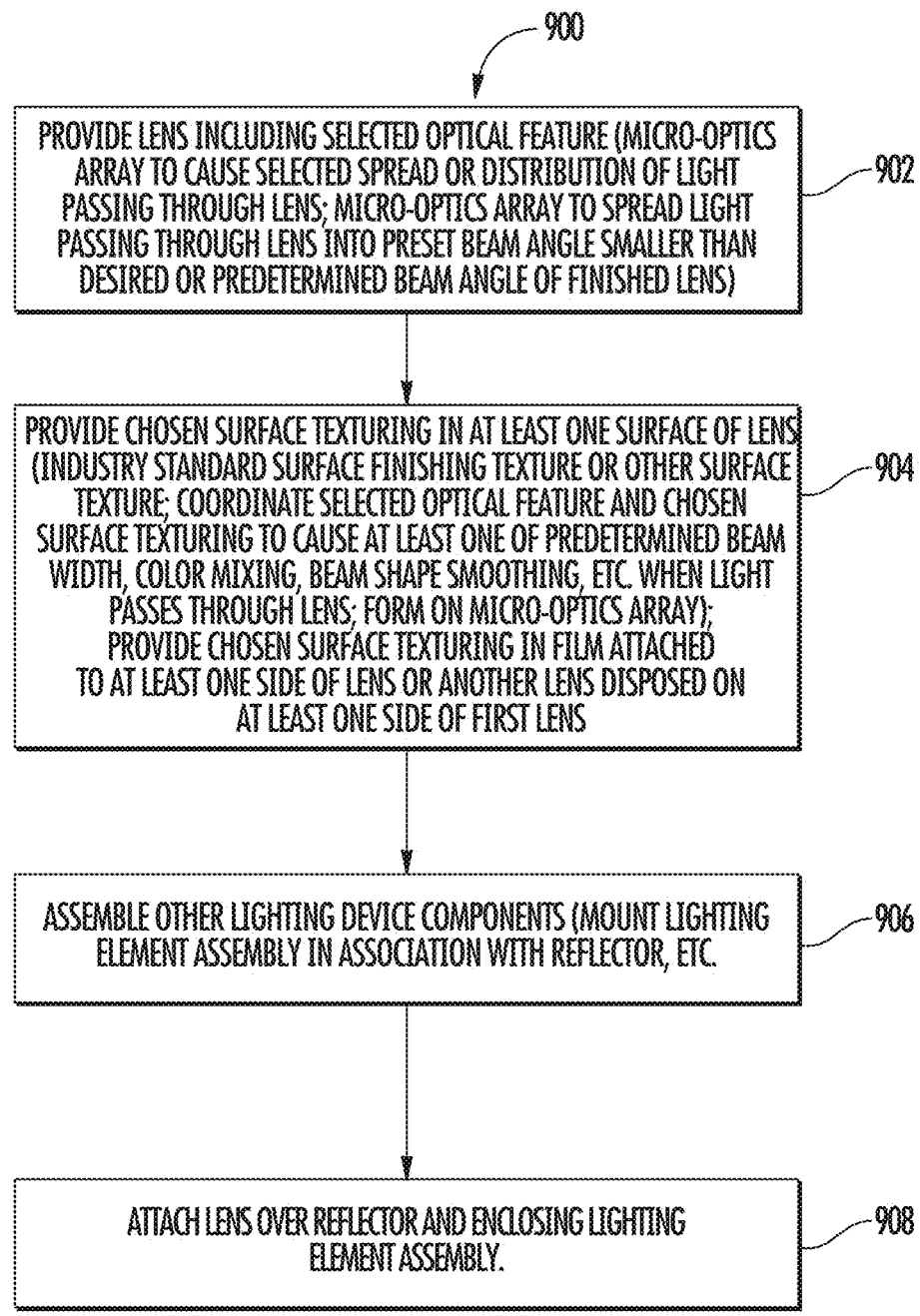
FIG. 9 is a flow chart of an example of a method for providing a lighting device in accordance with an embodiment of the present invention.

FIG. 9 is a flow chart of an example of a method 900 for providing a lighting device in accordance with an embodiment of the present invention. The method 900 may be used to fabricate a lighting device similar to the exemplary lighting device 100 described with reference to FIG. 1. In block 902, a lens or optical element may be provided including a selected optical feature. The lens may be provided or molded using a tool or mold provided by the method 300 of FIG. 3 or may be a tool or mold similar to that described with reference to FIGS. 4A-4C. Similar to that previously described the selected optical feature may be a micro-optics array that provides a selected spread or distribution of light passing through the lens. The micro-optics array may spread the light passing through the lens into a preset beam angle smaller than a desired or predetermined beam angle of the finished lens.

In block 904, a texturing may be provided or formed in at least a portion of the optical feature of the optical element or lens or at least a portion of the lens. The texturing may be formed in at least one surface of the optical element or lens. The texturing may be provided in a portion of the micro-optics array or in selected micro lenses of the micro-optics array. In another embodiment, the chosen surface texturing may be provided on another or opposite surface of the lens from the selected optical feature of micro-optics array. Similar to that previously described, the texturing may be an industry standard surface finishing texture or other surface texture.

Figure 11:
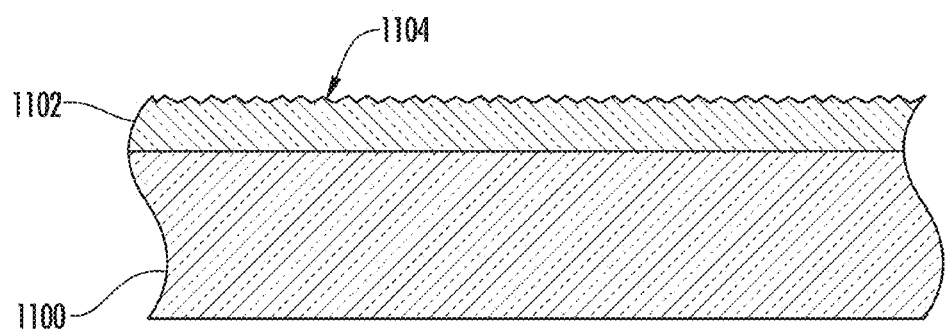
FIG. 11 is a cross-sectional view of an example of an optical system including a main lens and another secondary lens or film having a chosen surface texturing provided therein disposed on at least one side of the main lens in accordance with an embodiment of the present invention.

In accordance with another embodiment of the present invention, the texturing may be provided in a film and the film may be attached to at least one surface of the lens or optical element. In a further embodiment, the texturing may be provided in another lens or optical element, such as for example, a plain lens without any other optical features or a lens with other optical features provided in at least one side to provide a certain desired lighting effect. This secondary lens or optical element with the texturing may then be placed in coordination or alignment with the main lens including the selected optical feature. An example of an optical element 1100 and another optical element 1102, having a texturing 1104, being place in association with one another is illustrated in FIG. 11. Referring also to FIG. 11, the other optical element 1102 may be another lens or film. The other optical element 1102 or film includes a chosen surface texturing 1104 provided therein. The other optical element 1102 or film may be placed on at least one side of the first optical element 1100 in accordance with an embodiment of the present invention. Accordingly, the optical element 1102 may be disposed on one side or the other side of the optical element 1100. In another embodiment, optical elements 1102 may be disposed on both sides of the optical element 1100 to provide the desired optical lighting characteristics and ease of manufacturing. The optical element 1100 may include a selected optical feature, such as a micro-optics array similar to that previously described.

The selected optical feature and the chosen surface texturing may be selected or chosen in coordination with one another to provide at least one of a predetermined beam width or angle, a predetermined color mixing or color uniformity, a predetermined beam shape smoothing or other beam characteristics when light passes through the lens. Accordingly, these characteristics of the light or light beam passing through the lens may be controlled by the selection of the selected optical feature and the chosen surface texturing. The chosen surface texturing may be provided in the micro-optics array.

Referring back to FIG. 9, in block 906, other lighting device components may be assembled. For example, a lighting element assembly, such as assembly 108 in FIG. 1, may be assembled in association with a reflector, such as reflector 106 in FIG. 1.

In block 908, the lens may be disposed or attached over the reflector and enclosing the lighting element assembly to complete the lighting device.

Figure 10A:
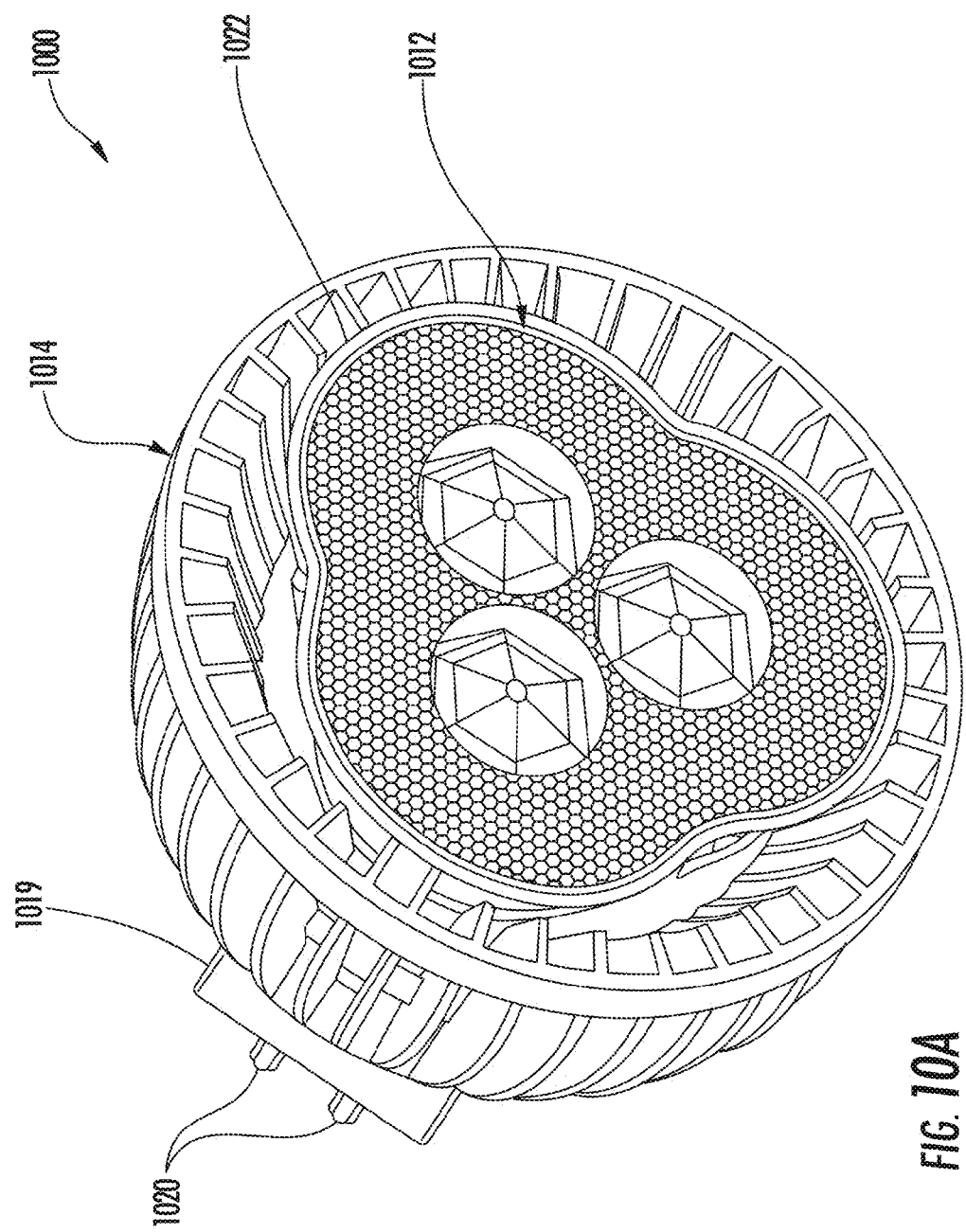
FIG. 10A is a perspective view of an example of a lighting system in accordance with an embodiment of the present invention.

FIG. 10A is a perspective view of an example of a lighting system 1000 in accordance with another embodiment of the present invention. The lighting system 1000 is disclosed and claimed in U.S. patent application Ser. No. 13/307,444, filed Nov. 30, 2011, and entitled "Optical Arrangement for a Solid-State Lighting System" which is assigned to the same assignee as the present application and is incorporated herein in its entirety by reference. In accordance with an embodiment of the present invention and as disclosed in more detail herein, the lighting system 1000 may be modified to include lenses having surface texturing similar to that previously described to control beam width and color mixing. The surface texturing may be selected to provide color mixing to meet Energy Star color spatial uniformity specifications or requirements previously described.

Figure 10B:
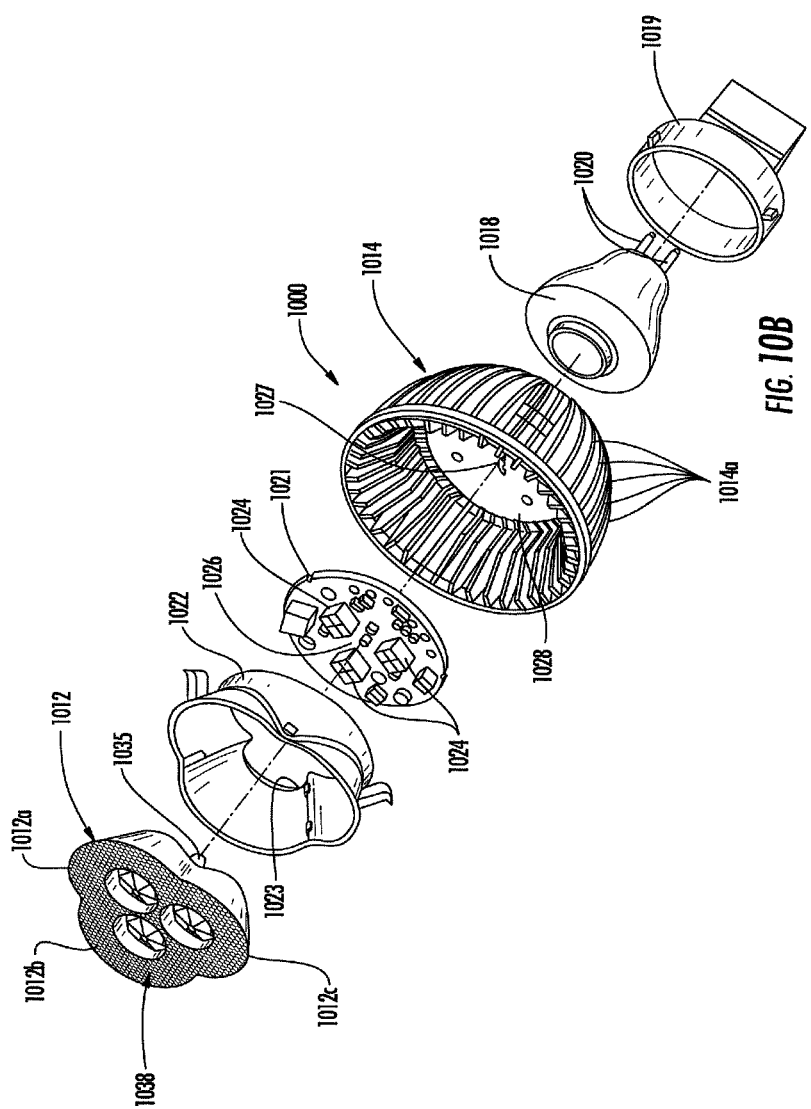
FIG. 10B is an exploded view of the major components of the lighting system of FIG. 10A.

Referring also to FIG. 10B, FIG. 10B is an exploded view of the major components of the lighting system 1000 of FIG. 10A. The lighting system 1000 may be an LED-based, solid-state replacement for a standard, MR16 halogen lamp. The lighting system 1000 or solid state lamp may include a TIR optical element 1012, which has three lobes 1012*a*, 1012*b* and 1012*c*. Each lobe corresponds to an LED light source 1024. Each light source in this example embodiment may include four LED chips. Lamp 1000 also includes a heat sink 1014 that may be made of aluminum or other thermally conductive material and may comprise a plurality of fins 1014*a* for dissipating heat to the ambient environment.

A power supply 1018 is provided that includes electrical components to provide the proper voltage and current to the LED light sources 1024 within lamp 1000. The power supply 1018 may be contained in a housing that is connected to the heat sink 1014. Connection pins 1020 provide a standard connection to power rails, which may be AC or DC supply rails. The lamp may also be used as a solid-state replacement for a standard, PAR type incandescent bulb. In such an application the lamp 1000 would include an Edison type base in place of pins 1020. Other connectors may be used to provide power to the lamp 1000 in other applications A diffuse, white, highly reflective secondary reflector 1022 may be provided within the heat sink structure 1014 of lamp 1000, so that the secondary reflector 1022 is substantially adjacent to but spaced a small air gap apart from the sidewalls of TIR optical element 1012. Secondary reflector 1022 is molded or thermoformed into the desired shape to fit together with the heat sink portion of the lamp and TIR optical element 1012. The secondary reflector 1022 may be made of many different materials, including materials that are made reflective by application of a powder coating, reflective paint, or the like. The air gap between the TIR optical element 1012 and the highly reflective secondary reflector 1022 serves to insure that the internal reflectivity of the optical element 1012 is not interfered with by the secondary reflector 1022. However, light that escapes by transmission from the TIR optical element 1012 is efficiently reflected back into the TIR optical element 1012 for another opportunity to eventually be transmitted or reflected from the exit surface 1038 of the optical element 1012.

Figure 10C:
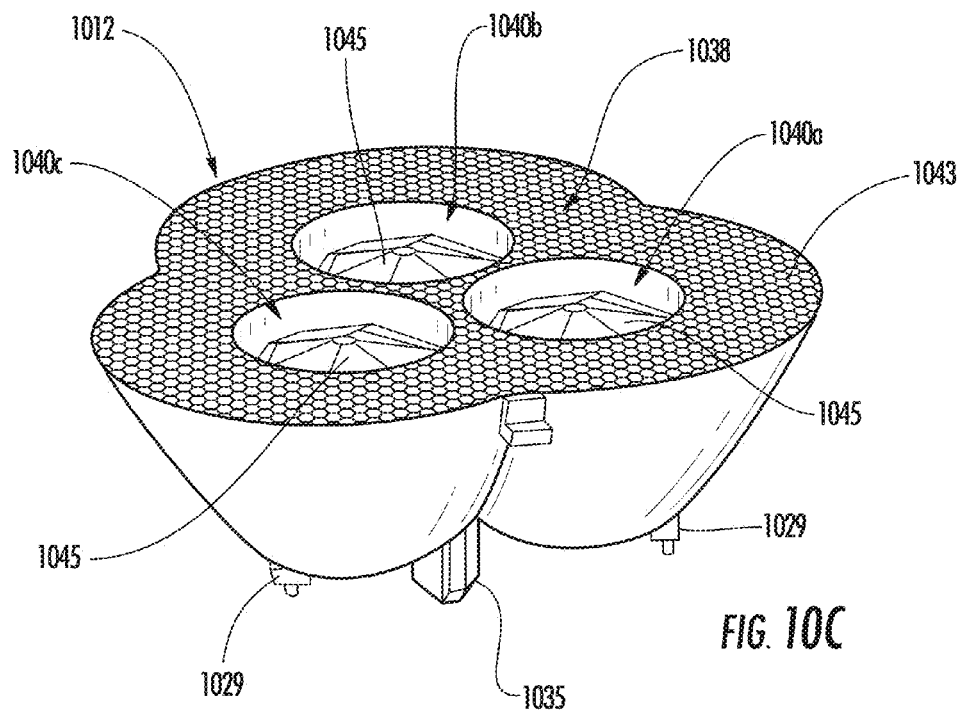
FIG. 10C is a perspective view of the TIR optical element of the lighting system of FIG. 10A.

A mounting surface 1021 is provided inside the lamp 1000 for mounting the LED light sources 1024. In the illustrated embodiment three LED light sources 1024 are arranged in an array so that each light source corresponds to a lobe 1012a, 1012b, and 1012c of the optical element 1012. A recess or slot 1026 is provided in the mounting surface 1021 and a corresponding recess or slot 1027 is provided in the base 1028 of heat sink 1014. The slots 1026 and 1027 are aligned when the mounting surface 1021 is mounted to the base of the heat sink 1014. The recesses or slots 1026 and 1027 receive a mating projection 1035 provided on the optical element 1012 to seat the TIR optical element 1012, for aligning the LED light sources 1024 and the TIR optical element 1012. Alternatively, a plurality of projections 1029 may be provided, for example around the periphery of the optical element 1012, that engage a plurality of mating recesses or slots provided on the mounting surface 1021 and/or heat sink 1014 as shown in FIG. 10C. Secondary reflector 1022 includes a hole or holes 1023 through which light passes from LED light sources 1024 into the TIR optical element 1012, and through which the projection passes so that the projections 1029 and/or 1035 can seat properly with the recesses of the mounting surface 1021 and/or the heat sink 1014. A retention ring, not shown, may be used to clamp the various portions of the lamp together and hold the optical element 1012 in the housing or heat sink 1014.

Various arrangements and types of LED light sources 1024 emitting various colors of light can be used with embodiments of the invention. The embodiment of the LED light source 1024 shown in FIG. 10B may include four LED chips or dies (hereinafter "chips") packaged on a submount or mounting surface 1021 with a lens (not shown). At least one of the LED chips may be a red-emitting LED, and at least one of other LED chip may be a blue-shifted yellow LED device. The blue-shifted yellow LED device may be packaged with a local phosphor to provide blue-shifted yellow LED devices. Such a blue-shifted yellow plus red (BSY+R) system is used to create substantially white light. In some embodiments, the red LEDs, when illuminated, emit light having dominant wavelength from 605 to 630 nm. In some embodiments, the LED chips for the BSY devices emit blue light having a dominant wavelength from 440 to 480 nm. The phosphor packaged with the blue LEDs when excited by the impinging blue light, may emit light having a dominant wavelength from 560 to 580 nm. This is but one example of light sources that can be used with embodiments of the present invention. Various numbers and types of LEDs can be combined. Further examples and details of mixing colors of light using solid state emitters can be found in U.S. Pat. No. 7,213,940, which is incorporated herein by reference.

Figure 10D:
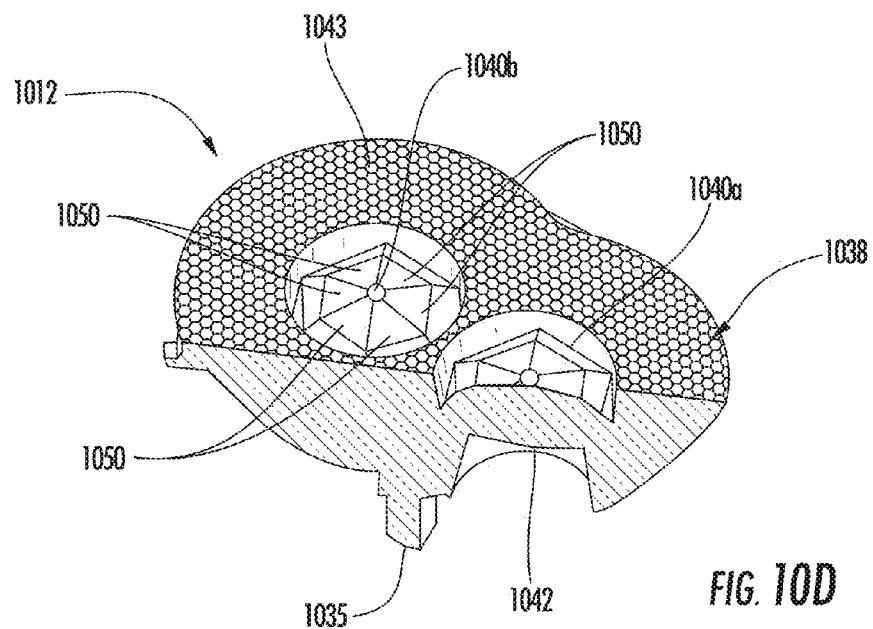
FIG. 10D is a perspective section view of the TIR optical element of FIG. 10C.

In the illustrated embodiment, the TIR optical element 1012 is shown with three lobes 1012a, 1012b, 1012c where each lobe corresponds to an LED light source 1024. Each light source 1024 may include a plurality of LED chips. Referring also to FIGS. 10C and 10D, the TIR optical element 1012 has an exit surface 1038 that comprises a first portion 1043 that comprises a flat substrate with a microlens or microoptics array for diffusing light and a second portion that comprises discrete lenses 1040a, 1040b and 1040c arranged in a one to one relationship with the LED light sources 1024. The lenses 1040a, 1040b and 1040c each have an exit surface 1045 through which the light exits the lenses. In the illustrated embodiment each lobe 1012a, 1012b and 1012c comprises a lens 1040a, 1040b and 1040c arranged such that one lens corresponds to and is arranged in line with one of the LED light sources 1024. The TIR optical element 1012 and the heat sink 1014 do not have to be provided with a lobed configuration provided that the lenses 1040a, 1040b and 1040c are provided on the TIR optical element 1012 in a one-to-one corresponding relationship to the LED light sources 1024. The lenses 1040a, 1040b and 1040c also include recessed, curved entrance surfaces 1042 that receive light from one of the LED light sources 1024 and that transmit light to the corresponding exit surfaces 1045 of lenses 1040a, 1040b and 1040c. While a single TIR optical element 1012 is shown, multiple TIR elements may be used.

Figure 10E:
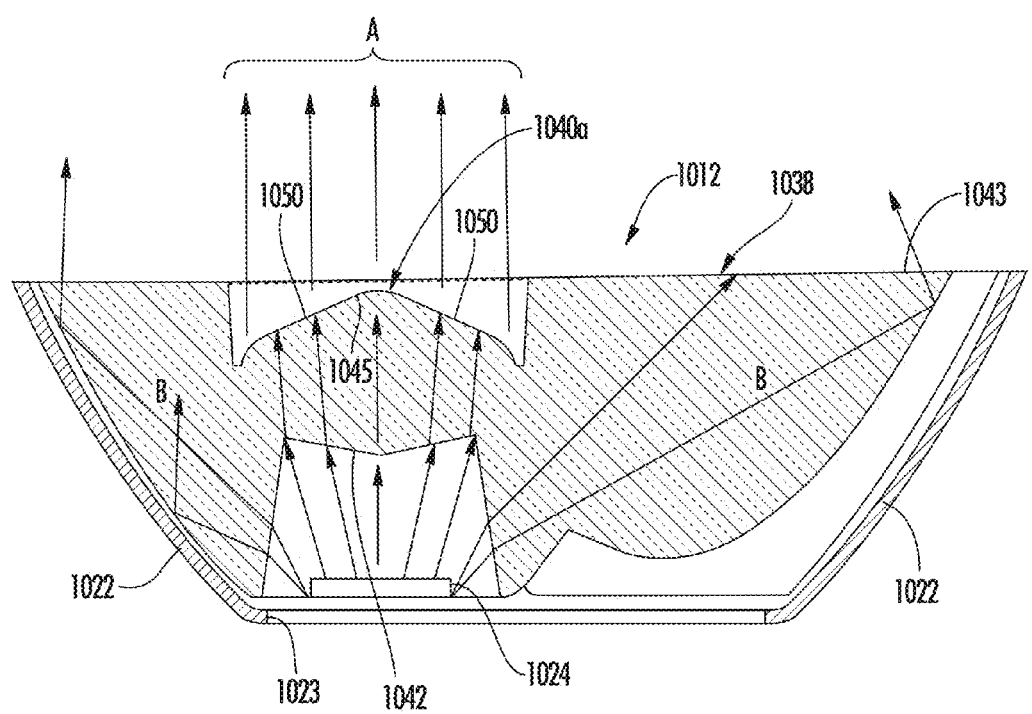
FIG. 10E is a side section view corresponding to the perspective section view of the TIR optical element of FIG. 10D showing the light paths through the TIR optical element.

Referring also to FIG. 10E, FIG. 10E is a side section view corresponding to the perspective section view of the TIR optical element of FIG. 10D showing the light paths through the TIR optical element 1012. Light from the LED light source 1024 is directed as shown in FIG. 10E where one lens 1040a, having an entry surface 1042, an exit surface 1045 and surrounding portion of the TIR optical element 1012, is shown. Each of the lenses 1040a, 1040b and 1040c operates in substantially an identical manner such that specific reference will be made to lens 1040a. A portion of the light A from light source 1024 is emitted directly into the entrance surface 1042, exits from exit surface 1045 and is focused by the lens 1040a to create a beam of collimated light. A further portion of the light B is directed onto the TIR surface of the TIR optical element 1012 where it is reflected toward exit surface 1038. The light may exit from the microlens 1043. The microlens 1043 mixes the light and disperses the light to overlap with the light exiting from lenses 1040a-1040c. Light that escapes from the TIR optical element 1012 may be reflected back into the TIR optical element by secondary reflector 1022 where it also may exit through the microlens 1043 and lens 1040a. Typically, the angular distribution of light emitted from an LED light source 1024 is close to Lambertian, which has Full Width at Half Maximum (FWHM) beam angle of 120 degrees. The TIR optical element 1012 as described herein may be used in directional lighting to collimate the light at a narrow beam angle such as between 12 and 60 degrees.

The lenses 1040*a*, 1040*b* and 1040*c* may be formed as faceted domed lenses to disperse the light in a manner that mixes the light and eliminates dark spots in the projected light. Round dome lenses are known for collimating light in directional lighting applications. One problem with round dome lenses is that the light projected from a plurality of LED chips may show up as distinct light areas separated by darker areas. For example, in a system that uses four LED chips light may be projected as four relatively distinct squares of light separated by darker, unlit lines. The faceted lenses 1040*a*, 1040*b*, 1040*c* better mix light exiting the lamp and eliminate the dark spots or lines to create a more uniform, better shaped beam. Additionally, the faceted lenses 1040*a*, 1040*b* and 1040*c* may be provided or formed with a chosen surface texturing similar to that described herein, such an standard surface finishing texture, for example an MT series surface finishing texturing (MT 11010, MT 11020, etc.) or other surface finishing texture to control beam width, color mixing, beam shape smoothing or other optical parameters.

Each faceted lens 1040*a*, 1040*b*, 1040*c* includes a plurality of facets 1050 on the entrance surface 1042 and/or exit surface 1045 that are disposed relative to the LED light sources 1024 such that light from each light source 1024 is mixed with light from other ones of the light sources 1024. The facets 1050 are disposed such that they are asymmetrically arranged with respect to the associated LED light source 1024 such that the light from each of the light sources is dispersed in an asymmetrical manner. The facets 1050 are arranged such that the lenses collimate the light beam. Each facet 1050 may be a planar surface or the facets may be slightly convex or concave in shape. In the embodiment of FIGS. 10A-10E, the facets 1050 are provided on the exit surfaces 1045. However, in another embodiment such as that described in U.S. patent application Ser. No. 13/307,444, the facets 1050 may be provided on the entrance surfaces 1042. The facets may be provided on either the entrance surfaces 1042 of the lenses 1040*a*, 1040*b*, 1040*c* or the exit surfaces 1045 of the lenses 1040*a*, 1040*b*, and 1040*c*. Moreover, both the exit surfaces and the entrance surfaces of each of the lenses 1040*a*, 1040*b*, and 1040*c* as described in U.S. patent application Ser. No. 13/307,444.

In accordance with embodiments of the present invention, any combination of the entrance surface 1042, the exit surface 1045 and the facets 1050 of the lenses 1040*a*, 1040*b* and 1040*c* may include surface texturing as described herein to control beam width, color mixing, beam shape smoothing and/or to satisfy Energy Star chromaticity specifications. For example, either only the entrance surface 1042 or the exit surface 1045 may include surface texturing. In another embodiment both surfaces may have surface texturing. In another embodiment either the entrance surface 1042 or the exit surface 1045 or both, and each of the facets 1050 of the lenses 1040*a*, 1040*b* and 1040*c* may have surface texturing. Either the entrance surface, exit surface or both surfaces of each facet 1050 may have surface texturing. In a further embodiment, only the facets of the lenses 1040*a*, 1040*b* and 1040*c* may include surface texturing.

While the surface texturing feature of the present invention has been described with respect to application to the exemplary lighting device 100 in FIG. 1 and lighting system 1000 in FIGS. 10A-10E, the surface texturing features described herein may also be applicable to other lighting devices and systems, and the invention is not intended to be limited by the exemplary lighting devices and systems described herein.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for providing an optical element, comprising:
   providing an optical feature in the optical element that spreads or distributes light passing through the optical element; and
   providing a texturing in association with at least a portion of the optical feature of the optical element, the texturing comprising a multiplicity of surface texturing features each having a depth between about 0.0004 inches and about 0.0010 inches and the surface texturing features being the only surface texturing features used in providing the texturing in association with the optical element.

2. The method of claim 1, wherein providing the texturing comprises providing at least one of a predetermined beam angle, a predetermined color mixing and a predetermined beam shape smoothing of light passing through the optical element.

3. The method of claim 1, wherein providing the optical feature comprises providing a micro-optics array in the optical element, wherein the micro-optics array comprises a multiplicity of micro lenses.

4. The method of claim 3, further comprising providing the texturing in at least a portion of the micro-optics array.

5. The method of claim 4, wherein providing the texturing in at least the portion of the micro-optics array comprises providing a type texturing to provide at least one of a predetermined beam angle, a predetermined color mixing and a predetermined beam shape smoothing of the light passing through the optical element.

6. The method of claim 5, wherein providing the micro-optics array comprises providing a micro-optics array configured to spread the light passing through the optical element into a preset beam angle smaller than the predetermined beam angle.

7. The method of claim 3, further comprising providing the texturing in selected ones of the multiplicity of micro lenses.

8. The method of claim 1, wherein providing the texturing in association with at least a portion of the optical feature of the optical element comprises:
   providing the texturing in a film; and
   placing the film in association with the optical element after providing the texturing in the film.

9. The method of claim 1, wherein providing the texturing in association with at least a portion of the optical feature of the optical element comprises:
   providing the texturing in another optical element; and
   placing the other optical element relative to the optical element to pass light through both optical elements.

10. The method of claim 1, wherein the optical element is formed by a molding process, a tool used in molding the optical element being etched with a chosen surface texturing that provides the texturing in at least the portion of the optical feature of the optical element when molded.

11. The method of claim 1, wherein the optical feature is formed in one surface of the optical element and the texturing is formed directly in an opposite surface of the optical element.

12. The method of claim 1, wherein the texturing is on a front side and a back side of the optical element.

13. The method of claim 1, wherein the texturing is uniform.

14. The method of claim 1, wherein providing the optical feature comprises providing a multiplicity of repeating lens elements and providing the texturing comprises providing the multiplicity of surface texturing features directly in a surface of each of the multiplicity of repeating lens elements.

15. A method for providing a lighting device, comprising:
providing a light source;
providing an optical element that receives and transmits light from the light source;
providing an optical feature in the optical element that spreads or distributes the light passing through the optical element; and
providing a texturing in at least a portion of the optical feature, the texturing comprising a multiplicity of surface texturing features each having a depth between about 0.0004 inches and about 0.0010 inches and the surface texturing features being the only surface texturing features used in providing the texturing in association with the optical element.

16. The method of claim 15, wherein providing the optical element comprises providing a total internal reflector (TIR).

17. The method of claim 16, wherein the TIR comprises an exit surface, the exit surface comprising a first portion including a micro-optics array and a second portion comprising at least one lens arranged in relationship with the light source.

18. The method of claim 17, wherein providing the texturing comprising providing the texturing in at least one of the micro-optics array and the at least one lens.

19. The method of claim 16, wherein the TIR comprises at least one lobe arranged in relationship with the light source, the at least one lobe comprising a lens to transmit light from the light source.

20. The lighting device of claim 19, wherein providing the texturing comprises providing the texturing in the lens.

21. An optical element, comprising:
an optical feature in the optical element that spreads or distributes light passing through the optical element; and
a texturing in association with at least a portion of the optical feature, the texturing comprising a multiplicity of surface texturing features each having a depth between about 0.0004 inches and about 0.0010 inches and the surface texturing features being the only surface texturing features used in providing the texturing in association with the optical element.

22. The optical element of claim 21, wherein the texturing provides at least one of a predetermined beam angle, a predetermined color mixing and a predetermined beam shape smoothing of light passing through the optical element.

23. The optical element of claim 21, wherein the texturing comprises a surface finishing texture.

24. The optical element of claim 21, wherein the optical feature comprises a micro-optics array, the micro-optics array comprising a multiplicity of micro lenses.

25. The optical element of claim 24, wherein the texturing is provided in at least a portion of the micro-optics array.

26. The optical element of claim 21, further comprising a total internal reflector (TIR).

27. The optical element of claim 26, wherein the TIR comprises an exit surface, the exit surface comprising a first portion including a micro-optics array and a second portion comprising at least one lens arranged in relationship with a solid state light emitter.

28. The optical element of claim 27, wherein the at least one lens comprises a plurality of facets.

29. The optical element of claim 27, wherein at least one of the micro-optics array and the at least one lens comprises the texturing.

30. The optical element of claim 26, wherein the TIR comprises at least one lobe, the at least one lobe comprising a lens.

31. The optical element of claim 30, wherein the lens comprises an entrance surface and an exit surface, and wherein the lens receives light from a solid state light emitter and transmits the light to the exit surface.

32. The optical element of claim 31, wherein the lens comprises a plurality of facets.

33. The optical element of claim 30, wherein the lens comprises the texturing.

34. An optical system for a lighting device, comprising:
a first optical element;
an optical feature provided in the first optical element that spreads or distributes light passing through the first optical element;
a second optical element; and
a texturing in at least a portion of the second optical element, the texturing comprising a multiplicity of surface texturing features each having a depth between about 0.0004 inches and about 0.0010 inches and the surface texturing features being the only surface texturing features used in providing the texturing in association with the optical element.

35. The lens system of claim 34, wherein the second optical element comprises a film, wherein the film is placed in association with the first optical element.

36. A lighting device, comprising:
a light source;
an optical element that receives and transmits light from the light source;
an optical feature in the optical element that spreads or distributes the light passing through the optical element; and
a texturing in at least a portion of the optical feature, the texturing comprising a multiplicity of surface texturing features each having a depth between about 0.0004 inches and about 0.0010 inches and the surface texturing features being the only surface texturing features used in providing the texturing in association with the optical element.

37. The lighting device of claim 36, wherein the light source comprises a solid state light emitter.

38. The lighting device of claim 36, further comprising a reflector to reflect light from the light source.

39. The lighting device of claim 36, wherein the optical element comprises a total internal reflector (TIR).

40. The lighting device of claim 39, wherein the TIR comprises an exit surface, the exit surface comprising a first portion including a micro-optics array and a second portion comprising at least one lens arranged in relationship with the light source.

41. The lighting device of claim 40, wherein at least one of the micro-optics array and the at least one lens comprises the texturing.

42. The lighting device of claim 39, wherein the light source comprises at least one solid state light emitter and the TIR comprises at least one lobe arranged in relationship with the at least one solid state light emitter, the at least one lobe comprising a lens to transmit light from the at least one solid state light emitter.

43. The lighting device of claim 42, wherein the lens comprises the texturing.

* * * * *